United States Patent [19]

Bergelt

[11] Patent Number: 4,625,939
[45] Date of Patent: Dec. 2, 1986

[54] ENGINE MOUNTING FOR MOTOR VEHICLES

[75] Inventor: Dieter Bergelt, Russelsheim, Fed. Rep. of Germany

[73] Assignee: General Motors Corporation, Detroit, Mich.

[21] Appl. No.: 755,616

[22] Filed: Jul. 16, 1985

[30] Foreign Application Priority Data

Jul. 18, 1984 [DE] Fed. Rep. of Germany ....... 3426378

[51] Int. Cl.⁴ ............................................. F16M 3/00
[52] U.S. Cl. .................................... 248/638; 248/659
[58] Field of Search ............... 248/638, 637, 674, 659, 248/615, 616, 634; 180/300; 267/140.1

[56] References Cited

U.S. PATENT DOCUMENTS 3,687,404  8/1972  Werner ........................... 248/659 X
3,883,099  5/1975  Hermann et al. ................. 248/659
4,240,141  12/1980 Vasiliev et al. ................. 248/638 X Primary Examiner—Ramon O. Ramirez
Attorney, Agent, or Firm—R. L. Phillips

[57] ABSTRACT

An engine mounting arrangement is disclosed having brackets attached to a vehicle body adapted for connection to damping blocks attached to an engine. Each bracket supports two slidable spring-loaded clamping pieces with teeth that coact with teeth of an intermediate piece that is attached to the respective damping block and is adapted to be inserted between the clamping pieces from below.

12 Claims, 5 Drawing Figures

ENGINE MOUNTING FOR MOTOR VEHICLES

TECHNICAL FIELD

The invention relates to an engine mounting arrangement for motor vehicles wherein brackets attached to the vehicle body connect with damping blocks attached to the engine.

BACKGROUND OF THE INVENTION

The usual procedure of assembling motor vehicles is to insert the engine from below into the body which is suspended from above, and with the two units then being interconnected from below. However, oftentimes the places where connection is to be made between the body and the engine are not easily accessible from below or are blocked by other parts, so that access to the connecting elements for mounting the engine to the body is possible only from above, i.e. when the vehicle is supported by its wheels. Thus, the initial installation of the engine into the body is only of a provisional nature and must be completed at a later time.

SUMMARY OF THE INVENTION

It is an object of the present invention to modify the procedure of installing the engine into the body to the effect that the initial step is that of establishing a self-retaining clamping connection which, at a later time, can be secured by a form-locking connection. According to the invention, the initial clamping connection is established in that each bracket attached to the body is provided with two displaceable spring-biased toothed clamping members which cooperate with toothing provided on an intermediate member that is secured to the damping block and is adapted for insertion from below between the clamping members.

The engine suspension according to the present invention simplifies and facilitates the procedure of installing the engine into the vehicle body because the operation of connecting the two units can be carried out even if the places provided for interconnecting the two units are not accessible from below but only from above.

Another advantageous feature of the invention is that the housing for receiving the clamping members is in the form of a downwardly open channel member with inwardly inclined walls. Furthermore, the channel member, the two clamping members and the intermediate member are provided with a transversely extending slot for insertion of a locking bolt to prevent unintended disengagement.

Other features and advantages of the invention will become apparent from the accompanying drawings and the associated description.

DESCRIPTION OF THE DRAWINGS

The drawings illustrate exemplary embodiments of the invention, wherein.

Figure 1:
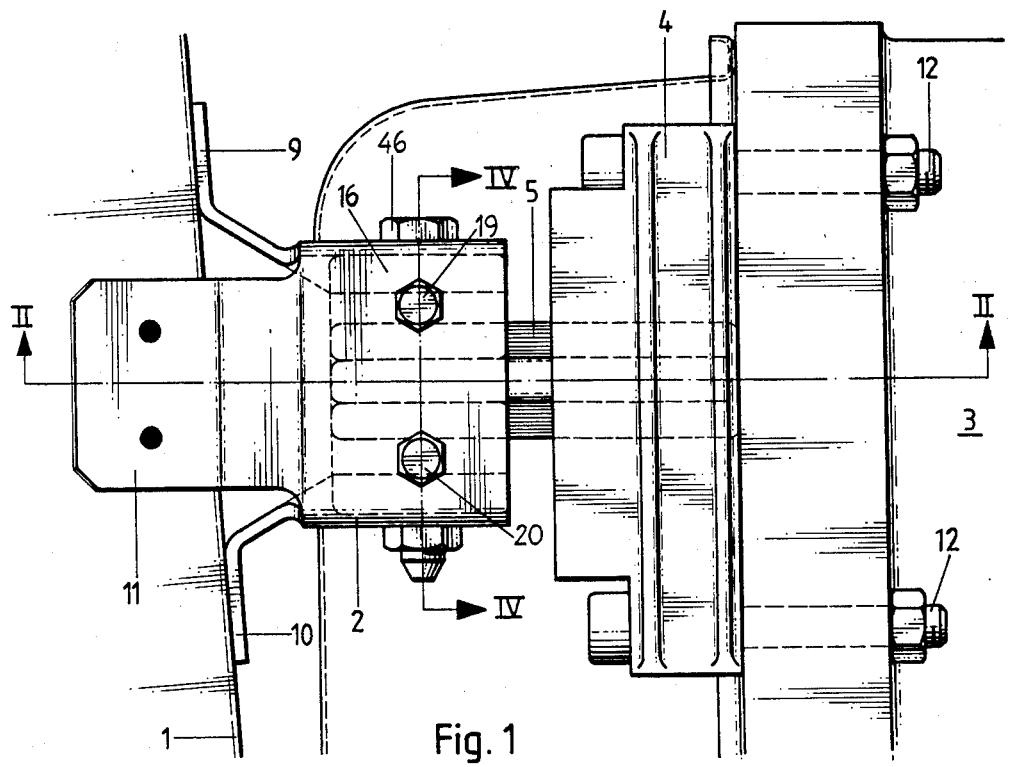
FIG. 1 is a plan view of the engine mounting arrangement at each engine mounting point.
Figure 2:
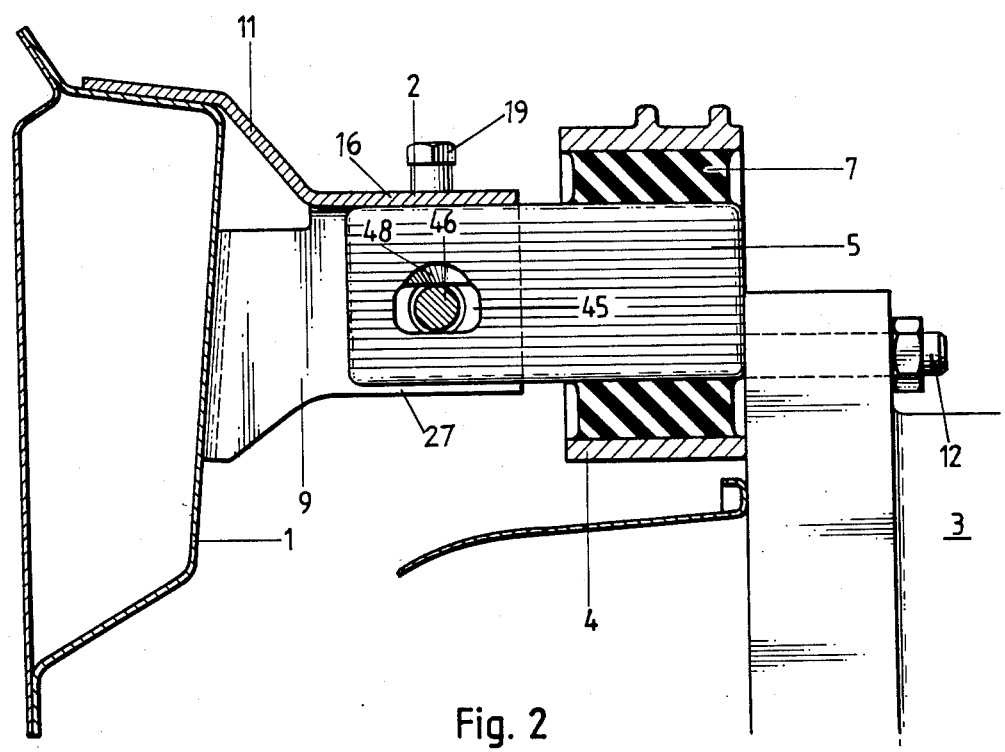
FIG. 2 is a sectional view along line 2—2 of FIG. 1.

The engine mounting arrangement at each engine mounting point is comprised of a bracket 2 attached to a vehicle body 1, a damping block 4 attached to an engine 3, and a wedge-shaped intermediate member 5 projecting laterally out of the damping block and adapted to be inserted from below into the bracket 2. The wedge-shaped intermediate member 5 is made, preferably, of metal and is vulcanized into the rubber 7 of the damping block 4. The bracket 2 is welded, by means of flanges 9, 10, 11 to the body 1, whereas the damping block 4 is detachably secured to the engine 3 by means of threaded bolts 12.

Figures 3, 5:
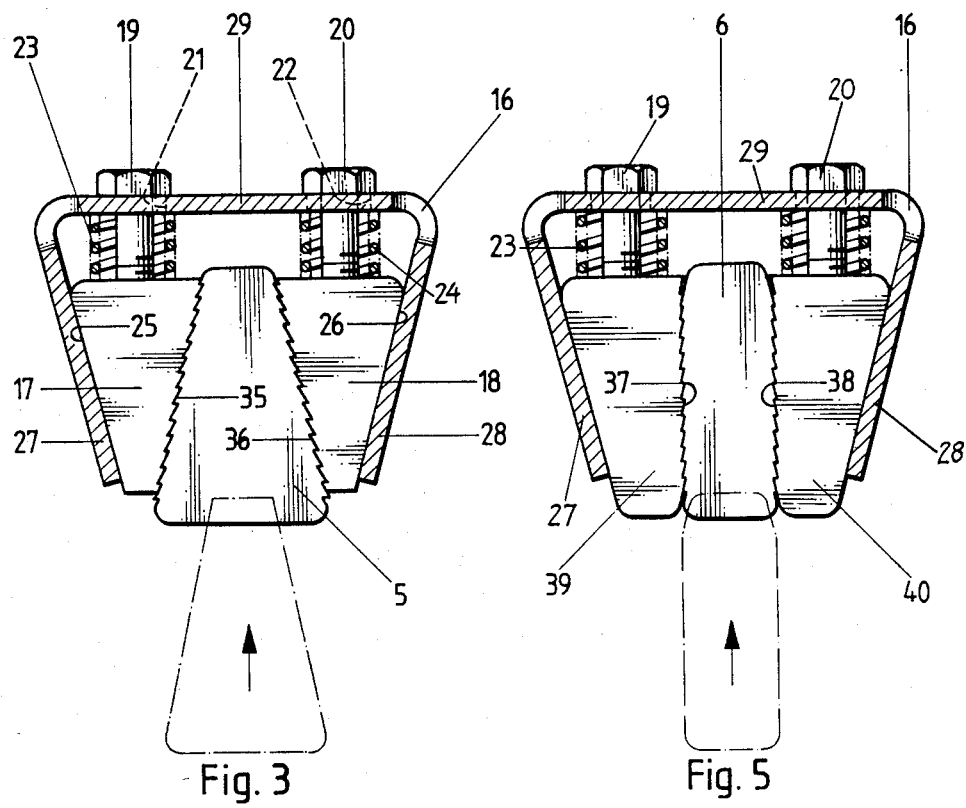
FIG. 3 is a front elevation of the bracket secured to the body.
FIG. 5 is another embodiment of the bracket according to FIG. 3.

The bracket 2 fastened to the body 1 is comprised of the channel member 16 which forms the housing, and a pair of displaceable clamping members 17 and 18 which are retained in the channel member 16 by means of threaded bolts 19 and 20. The threaded bolts 19 and 20 extend, respectively, through apertures 21 and 22 of the channel member 16 and through coil springs 23 and 24 which engage the channel member 16 and the clamping members 17 and 18. The clamping members 17 and 18 are provided respectively, with tapered outersurfaces 25 and 26 which engage with respective inwardly inclined walls 27 and 28 of the channel member 16. The heads of the bolts 19 and 20 are urged, respectively, by the springs 23 and 24 against the web 29 of the channel member 16. The angled inner surfaces of the clamping members 17 and 18 have ratchet-like toothings 35 and 36 which engage corresponding toothings of the wedge-like intermediate member 5 in such a manner that the wedge-like member 5 can be inserted from below between the clamping members 17 and 18, but cannot be removed afterwards because the teeth of the wedge-like intermediate member 5 and those of the clamping members 17 and 18 are in locking engagement with one another to thus block movement in the downward direction. The springs 23 and 24 enable the clamping members 17 and 18 to be displaced upwardly when the intermediate member 5 is urged upwardly between the clamping members and then cause the interengagemenet of the toothings. The teeth of the toothed surfaces 35 and 36 are such that tolerance compensation can occur in the direction of toothing. The intermediate member 5, instead of having a wedge-like configuration as illustrated in FIG. 3, may also be rectangular, as illustrated in FIG. 5 and identified by the reference number 6. In this instance, the inner surfaces 37 and 38 of the clamping members 39 and 40 extend parallel to one another.

Figure 4:
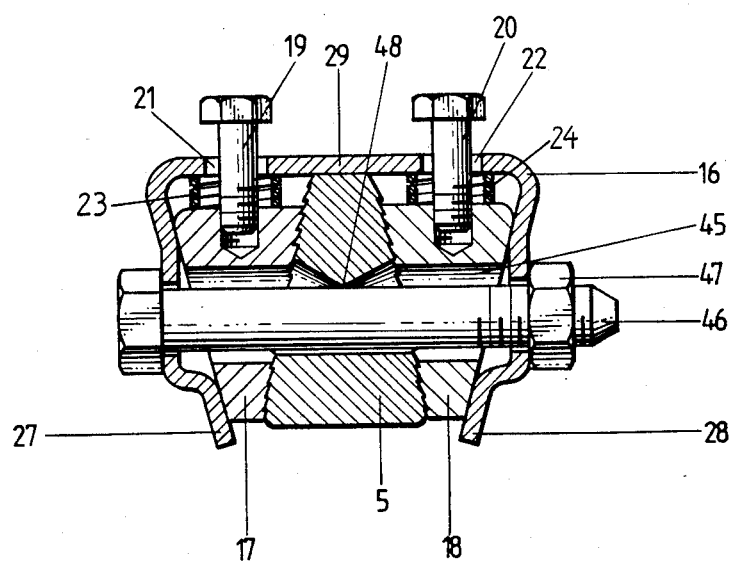
FIG. 4 is a section along line 4—4 of FIG. 1.

The final position of the connection is illustrated in cross-section in FIG. 4. In the walls 27 and 28 of the channel member 16, in the clamping members 17 and 18 and in the intermediate member 5 there is provided a transversely extending slot 45 through which a locking bolt 46 is inserted and fastened by a threaded nut 47 so as to make the connection secure. The slot 45 can be as wide as the tolerance required between the engine 3 and the body 1.

When being inserted between the clamping members 17 and 18, the intermediate member 5 is urged upwardly until it almost engages the web 29, so that a self-retaining clamping connection is established between the bracket 2 and the damping block 4. FIG. 3 illustrates an intermediate position. When the vehicle, after installation of the engine mounting assembly, is lowered onto its wheels, the intermediate member 5 is caused to move into the position shown in FIG. 4 in which the end face of the intermediate member 5 engages the web 29 of the channel member 16. The projection 48 in the slot 45 of the intermediate member 5 now clears the path to allow insertion of the locking bolt 46, which will also cause the intermediate member 5 to be urged upwardly, so that, after applying and tightening the threaded nut 47, the final form-locking connection is established between the body 1 and the engine 3. The tightening of the threaded nut 47 also causes the intermediate member 5, by means of the wedge-like shape of the members 5, 17 and 18 and the toothing 35, 36 to be urged upwardly against the web 29. If, on account of repair work or engine replacement, the engine mount is to be disconnected, the damping block 4 is unthreaded from the engine 3 and, after lowering of the engine 3, the damping block 4 at each mounting point can be withdrawn laterally.

The invention has been described by way of two exemplary embodiments illustrated in the drawing. However, the concept of the invention is not limited to the configurations of these particular exemplary embodiments, because a great variety of engine mounting configurations and arrangements may fall within the scope of the invention without departing from the general concept of the invention.

The embodiments of the invention in which an exclusive property or privilege is claimed are defined as follows:

1. An engine mounting for motor vehicles having brackets attached to a vehicle body for connection to damping blocks attached to an engine, characterized by each bracket supporting two spaced apart slidable spring-loaded clamping pieces with teeth on inner surfaces thereof, and an intermediate piece attached to the respective damping blocks, the intermediate piece having teeth on two of its surfaces which cooperate with the teeth of the clamping pieces when the intermediate piece is inserted therebetween from below.

2. An engine mounting according to claim 1, characterized by the slidable clamping pieces having inclined surfaces which abut associated inclined surfaces of a housing receiving the clamping pieces.

3. An engine mounting according to claim 1 or 2, characterized by the intermediate piece protruding laterally from the damping block and being embedded in rubber in the damping block by vulcanization.

4. An engine mounting according to claim 2, characterized by the housing having a downwardly opening U-section plate with inwardly inclined arms.

5. An engine mounting according to claim 4, characterized by bolts inserted in holes in a crossbar portion of the U-section plate and screwed into the clamping pieces and arranged to guide coil springs which are supported against end faces of the clamping pieces and crossbar.

6. An engine mounting according to claim 1 characterized by the clamping pieces and the intermediate pieces being wedge-shaped.

7. An engine mounting according to claim 1 characterized by the intermediate piece being rectangular and the toothed surfaces of the clamping pieces extending parallel to each other.

8. An engine mounting according to claim 1, characterized by the teeth of the toothed pieces being formed so that after insertion of the intermediate piece, the latter cannot slip out downwardly.

9. An engine mounting according to claim 4, characterized by the arms of the U-section plate, the clamping pieces and the intermediate piece all having a transversely extending slot for passing a locking bolt therethrough.

10. An engine mounting according to claim 9, characterized by the intermediate piece having a projection in the slot which allows the locking bolt to be passed through only when an end face of the intermediate piece abuts against the crossbar of the U-section plate.

11. An engine mounting according to claim 1, characterized by the intermediate piece protruding laterally from the damping block and the clamping pieces being made of metal.

12. An engine mounting according to claim 4, characterized by the U-section plate having straps for attachment to the vehicle body and the damping block being attached to the engine by means of bolts.

* * * * *